US009906272B2

(12) United States Patent
Kerselaers (10) Patent No.: US 9,906,272 B2
(45) Date of Patent: Feb. 27, 2018

(54) COMMUNICATIONS DEVICE (71) Applicant: NXP B.V., Eindhoven (NL)

(72) Inventor: Anthony Kerselaers, Herselt (BE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/090,933

(22) Filed: Apr. 5, 2016

(65) Prior Publication Data

US 2017/0288731 A1 Oct. 5, 2017

(51) Int. Cl.
*H04B 13/00* (2006.01)
*H04B 5/00* (2006.01)
*H04H 40/45* (2008.01)
*H01Q 1/27* (2006.01)

(52) U.S. Cl.
CPC .......... *H04B 5/0031* (2013.01); *H01Q 1/273* (2013.01); *H04B 5/0081* (2013.01); *H04B 13/00* (2013.01); *H04B 13/005* (2013.01); *H04H 40/45* (2013.01)

(58) Field of Classification Search
CPC .................................................... H04B 13/005
USPC ............................................... 455/41.1, 41.3
See application file for complete search history.

(56) References Cited

U.S. PATENT DOCUMENTS

| 8,121,662 | B2 | 2/2012 | Martin et al. |
| 8,532,568 | B2 | 9/2013 | Kerselaers |
| 9,054,773 | B2 | 6/2015 | Kerselaers |
| 9,197,986 | B1 | 11/2015 | Kerselaers et al. |
| 2002/0030630 | A1 | 3/2002 | Maeda et al. |
| 2008/0186241 | A1* | 8/2008 | Christensen ......... A61B 5/0028 343/718 |
| 2009/0124201 | A1* | 5/2009 | Meskens ............. A61B 5/0028 455/41.2 |
| 2010/0019982 | A1 | 1/2010 | Washiro |
| 2011/0316693 | A1* | 12/2011 | Loen .................. G08B 21/0219 340/539.13 |
| 2014/0009262 | A1* | 1/2014 | Robertson ............ A61B 5/0006 340/5.52 |
| 2014/0213184 | A1* | 7/2014 | Matsubara ........... H04B 5/0031 455/41.1 |
| 2015/0312704 | A1* | 10/2015 | Tarnhed ................ H04W 4/008 455/41.1 |
| 2016/0073883 | A1* | 3/2016 | Charrat ................ A61B 5/0028 600/485 |
| 2016/0149649 | A1* | 5/2016 | Bengtsson ............. G01R 29/12 455/41.2 |

* cited by examiner

*Primary Examiner* — Wen Huang (57) ABSTRACT

One example discloses a communications device, including: a bio-antenna conducting surface configured to receive a set of bio-antenna modulated broadcast signals; wherein the conducting surface is configured to receive the set of bio-antenna modulated broadcast signals through a capacitively coupling; a broadcast receiver coupled to the conducting surface; and wherein the conducting surface is configured to pass the broadcast signals to the broadcast receiver.

19 Claims, 7 Drawing Sheets

COMMUNICATIONS DEVICE

The present specification relates to systems, methods, apparatuses, devices, articles of manufacture and instructions for communications.

SUMMARY

According to an example embodiment, a communications device, comprising: a bio-antenna conducting surface configured to receive a set of bio-antenna modulated broadcast signals; wherein the conducting surface is configured to receive the set of bio-antenna modulated broadcast signals through a capacitively coupling; a broadcast receiver coupled to the conducting surface; and wherein the conducting surface is configured to pass the broadcast signals to the broadcast receiver.

In another example embodiment, the conducting surface is configured to be positioned proximate to but not directly touching a bio-antenna.

In another example embodiment, the conducting surface conforms to a contour of a bio-antenna.

In another example embodiment, the conductive surface has a set of planar dimensions that are less than 10% of a wavelength of the broadcast signals that the conductive surface is configured to receive.

In another example embodiment, the conducting surface is configured to transmit and receive NFC signals and is configured to receive broadcast signals.

In another example embodiment, the conducting surface includes at least one of: a metalized plastic foil; a copper material, or a flexible dielectric material.

In another example embodiment, further comprising additional conducting surfaces configured to receive a second set of bio-antenna modulated broadcast signals and pass the second set of broadcast signals to the broadcast receiver.

In another example embodiment, the set of broadcast signals are included in at least one of: an FM radio band; a set frequencies ranging from 87.5 MHz to 108.0 MHz; or a near field communications (NFC) frequency band.

In another example embodiment, the bio-antenna conducting surface is configured to receive at least one of: a set of human body modulated broadcast signals, a set of human arm modulated broadcast signals, a set of biological structure modulated broadcast signals, a set of living organism modulated broadcast signals, a set of animal modulated broadcast signals, or a set of plant modulated broadcast signals.

In another example embodiment, further comprising a filter coupled between the conducting surface and the broadcast receiver and configured to pass the set of broadcast band frequencies received by the conducting surface to the broadcast receiver.

In another example embodiment, the filter is at least one of: a tuning circuit or a matching circuit.

In another example embodiment, the broadcast receiver is an FM radio receiver.

In another example embodiment, further comprising a coil and a near field communication (NFC) circuit; and the coil couples the NFC circuit to the conducting surface.

In another example embodiment, the coil is at least one of: a planar air coil, or a wire wound on a ferrite rod.

In another example embodiment, the coil is tuned to the NFC circuit's operating frequency.

In another example embodiment, the NFC circuit is configured to be coupled to a set of nodes in a body area network; and the NFC circuit is configured to communicate with the set of nodes using near-field magnetic induction signals.

In another example embodiment, further comprising a blocking filter coupled between the conducting surface and the broadcast receiver; and the blocking filter is configured to block a set of NFC circuit signals from reaching the broadcast receiver.

In another example embodiment, the blocking filter is at least one of: a high-pass filter, low-pass filter, a notch filter, or a broadband bandpass filter.

In another example embodiment, further comprising a first and second NFC device; wherein the communications device is configured to communicate a set of demodulated broadcast signals to the first NFC device; and wherein the first NFC device is configured to communicate the set of demodulated broadcast signals to the second NFC device.

In another example embodiment, the communications device is embedded in at least one of: an earbud, a smartwatch; a medical implant; a smartphone, an item of clothing; a cellular phone, a portable radios, a wearable product, a body attached communication node, a chip, a semiconductor device, or a radio IC.

In another example embodiment, the communications device is configured to receive at least one of: a magnetic induction signal; a near-field signal; a cellular signal, a Wi-Fi signal, a Bluetooth signal.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Body wearable devices are a type of mobile device which can be either carried or worn by its user. Such devices may include: cellular phones, portable radios, wearable products, body attached communication nodes, and the like, perhaps designed to receive multiple communications bands at different frequencies, including: cellular, Wi-Fi, Bluetooth and broadcast.

Some body wearable devices are able to communicate with each other as part of a body area network, where near fields are used to communicate between devices. Near field induction can operate in a frequency range between 8 and 30 MHz.

The hardware necessary for these devices to receive communications varies.

Figure 1:
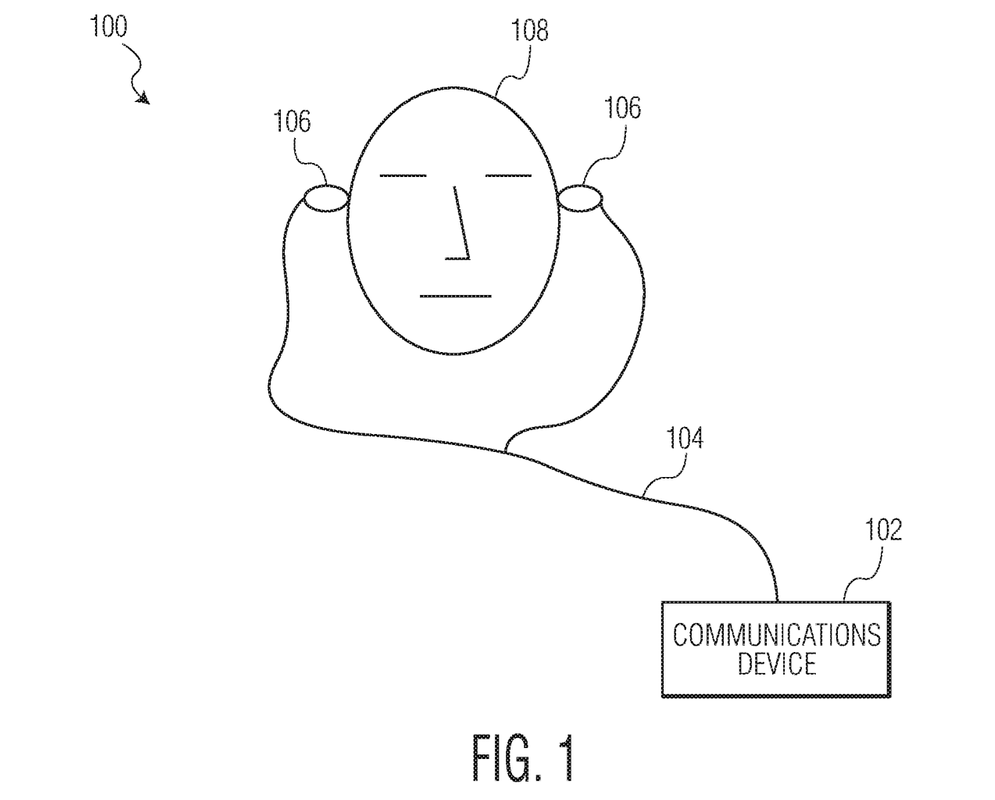
FIG. 1 is a first example mobile communications device.

FIG. 1 is a one example of mobile communications apparatus 100. The system includes a communications device 102, a set of headset wires 104 (i.e. an antenna for receiving RF and baseband audio signals), and a headset 106, wherein the headset 106 is being worn by a user 108.

Broadcast reception is provided by the set of headset wires 104, which functions as an antenna for an FM broadcast band (e.g. 87.5 to 108 MHz). The headset wires 104 have a length greater than or equal to a quarter wave length of the broadcast reception frequency.

In this example, a cellular phone including the mobile communications apparatus 100 would require attachment of a relative long wire to be able to receive the broadcast stations. In such an example if someone wants to listen to a FM station at 98 MHz then the shortest wire that can be considered has a quarter wave length (e.g. about 76 cm). In practice the antenna function can be combined with the headset wire which is roughly 90 cm long. Such an example requires the headset wire to be present for broadcast reception.

Figure 2:
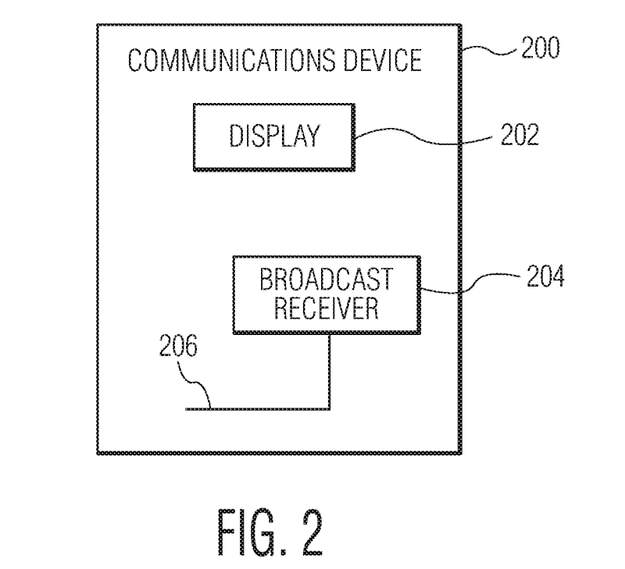
FIG. 2 is a second example mobile communications device.

FIG. 2 is an example mobile communications device 200. The device 200 includes a display 202, a broadcast receiver 204, an integrated broadcast antenna 206.

The antenna 206 converts an electric field wirelessly received from of a broadcast transmitter (not shown) to an electric signal that can be further amplified and demodulated by the receiver 204. The receiver 204 includes circuits for the reception of broadcast stations.

Since the antenna 206 is integrated into the device 200, the antenna's 206 length is restricted and functions as a less efficient antenna then the headset wires 104 of the mobile communications apparatus 100.

While the antenna's 206 length is very short, compared with the wavelength, the antenna 206 would still have a length on the order of 10 cm, which may still be rather longer than idea for some body worn device applications, such as a smartwatch. Also, due to the antenna's 206 shorter length the received broadcast signal strength is strongly attenuated.

For example a standard reference dipole antenna will receive 975 μVolts when it is placed at a location where the signal's field strength is 1 mV/meter (at a frequency of 98 MHz). However with the antenna length of 10 cm, the received signal will be only 50 μVolts when it is placed at a location where the field strength is 1 mV/meter (at a frequency of 98 MHz). This is a 25.8 dB signal level reduction.

Figure 3:
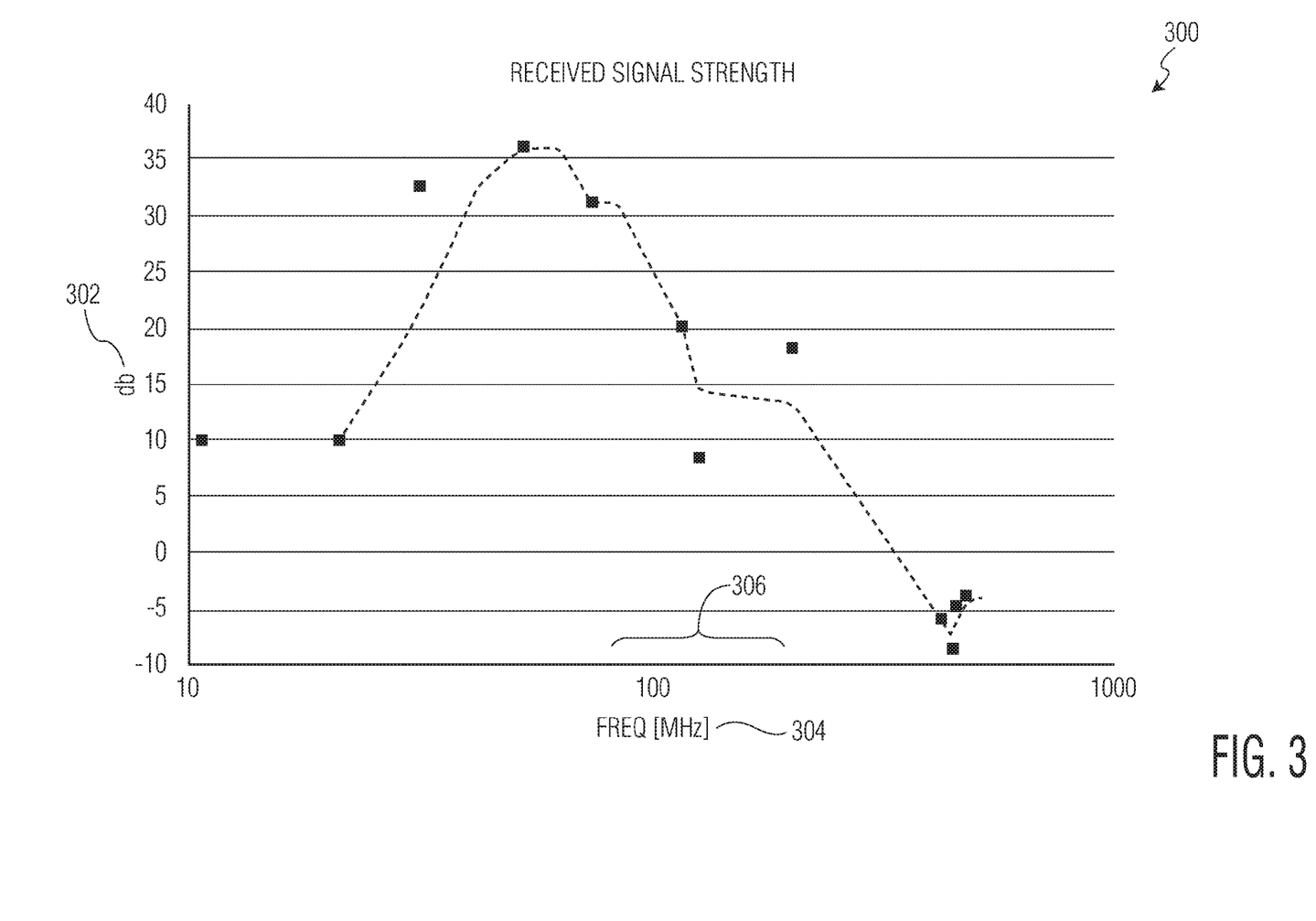
FIG. 3 is a first example set of measurements.

FIG. 3 is a first example set of measurements 300 of a bio-antenna received signal strength 302 over a range of signal frequencies. In the example set of measurements 300 the data points are for a human body bio-antenna. Similar data points can be achieved when the bio-antenna is attached to various other biological structures.

The range of signal frequencies 304 (i.e. x-axis) presents a received frequency in logarithmic scale and the bio-antenna received signal strength 302 (i.e. y-axis) presents the relative strength in dB.

These particular measurements were collected from a male person of 176 cm height. There is a resonance frequency at 60 MHz. The −10 dB bandwidth is found to be between 35 and 100 MHz. The resonance frequency can by a bit different between persons since it is dependent on height of the person. However it can be seen from this figure that efficient reception of broadcast signals is possible in the FM frequency band, wherein the human body acts as a bio-antenna.

Figure 4:
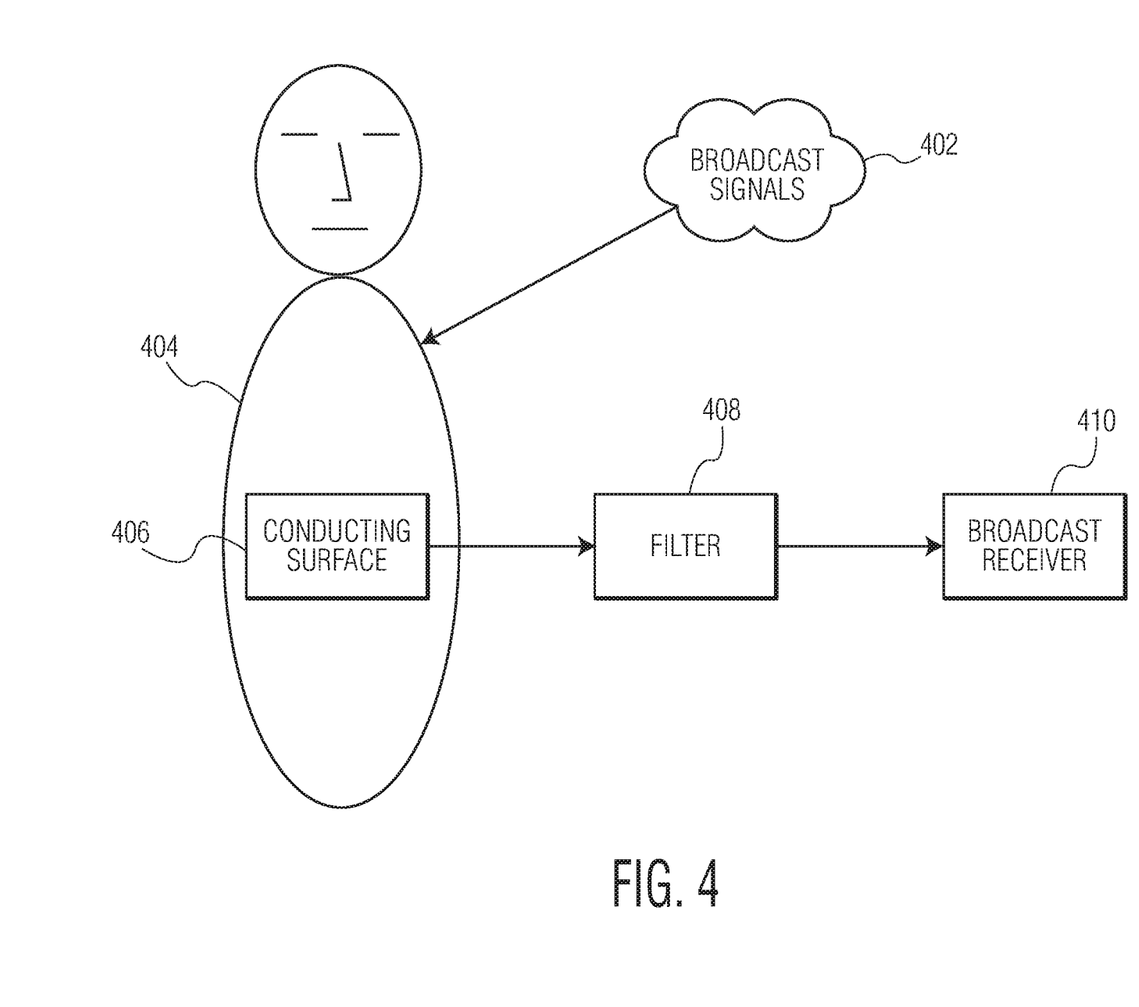
FIG. 4 is a third example mobile communications device.

FIG. 4 is a third example mobile communications device 400. Broadcast signals 402 are transmitted by a broadcast transmitter (not shown). The bio-antenna 404 (e.g. a user, a human body, an animal, a tree, a plant, etc., alive or not) captures a portion of the broadcast signals 402, as shown in FIG. 3.

A conducting surface 406 (forms a capacitor) is either affixed or placed proximately to the bio-antenna 404, thereby capacitively coupling the surface 406 with the bio-antenna 404. In certain example embodiments the conducting surface 406 conforms to a contour of the bio-antenna 404 to which it is attached. The conducting surface 406 is in one example embodiment a metalized plastic foil with a surface area of 2 by 3 $cm^2$.

In one embodiment, the conducting surface 406 is attached to a portion of the bio-antenna 404 such as an arm. In other example embodiments, more than one conducting surface 406 can be attached and/or placed proximate to the bio-antenna 404.

The conducting surface 406 is coupled to a filter 408. The filter 408 passes a set of broadcast band frequencies received by the conducting surface 406 to a broadcast receiver 410 (e.g. an FM radio receiver). The filter 408, in various example embodiments, can be tuned to a narrower portion of the broadcast band and/or perform additional impedance matching between the combination bio-antenna 404 and conducting surface 406 impedance and the broadcast receiver's 410 input impedance.

Thus the third example mobile communications device 400 couples the broadcast signals 402 to the broadcast receiver 410.

Figure 5:
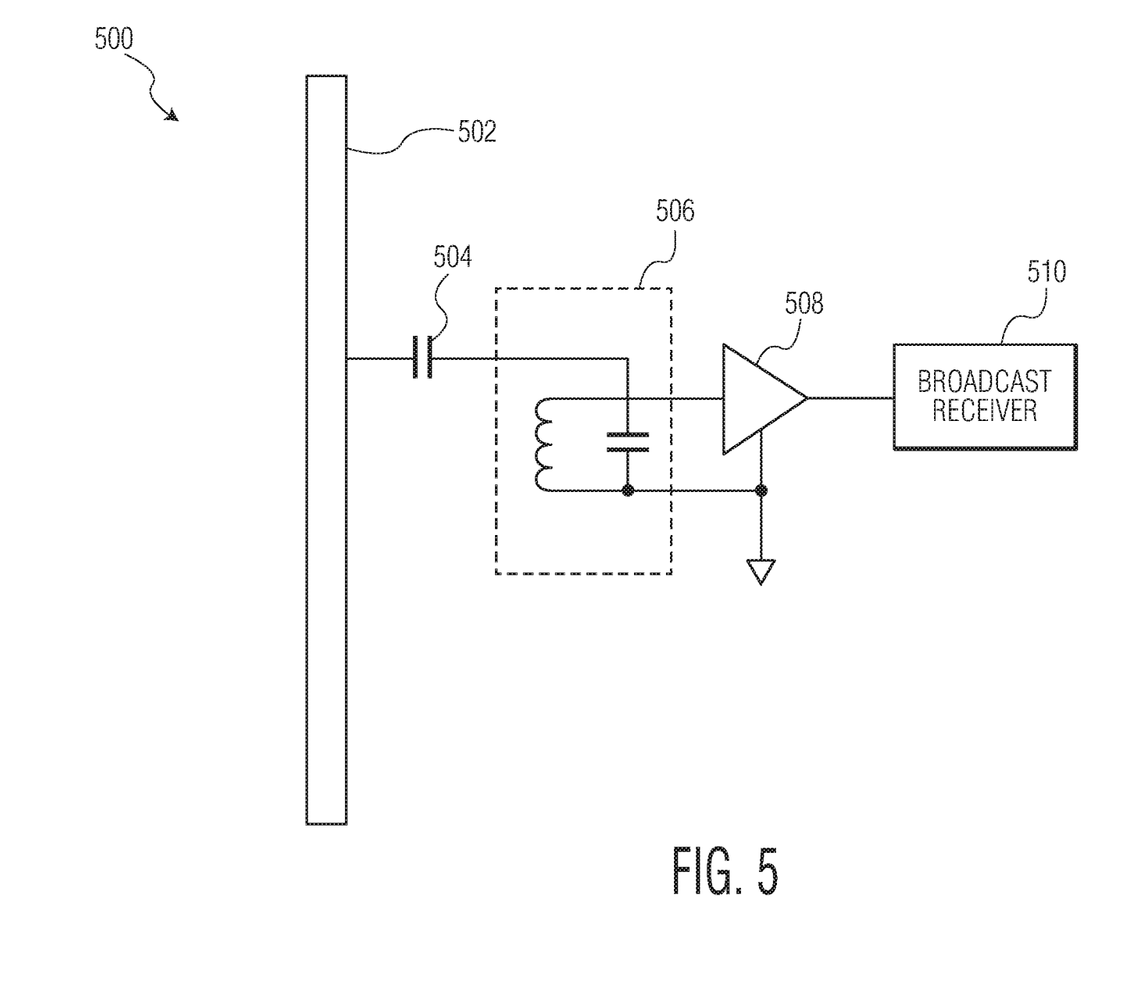
FIG. 5 is a first example electrical circuit for the mobile communications device.

FIG. 5 is a first example electrical circuit 500 for the mobile communications device 400. A capacitive coupling 504, formed from the conducting surface 406 in FIG. 4, connects a bio-antenna 502 to a tuning circuit 506. The tuning circuit 506 includes an inductor and a capacitor, which in some example embodiments are adjustable.

The tuning circuit 506 is coupled to a low noise amplifier 508. Together the tuning circuit 506 and the low noise amplifier 508 represent the filter 408 in FIG. 4. The low noise amplifier 508 is connected to a broadcast receiver 510 (e.g. radio system). The tuning circuit 506 and low noise amplifier 508 in one example are adjusted by the broadcast receiver 510.

Figure 6:
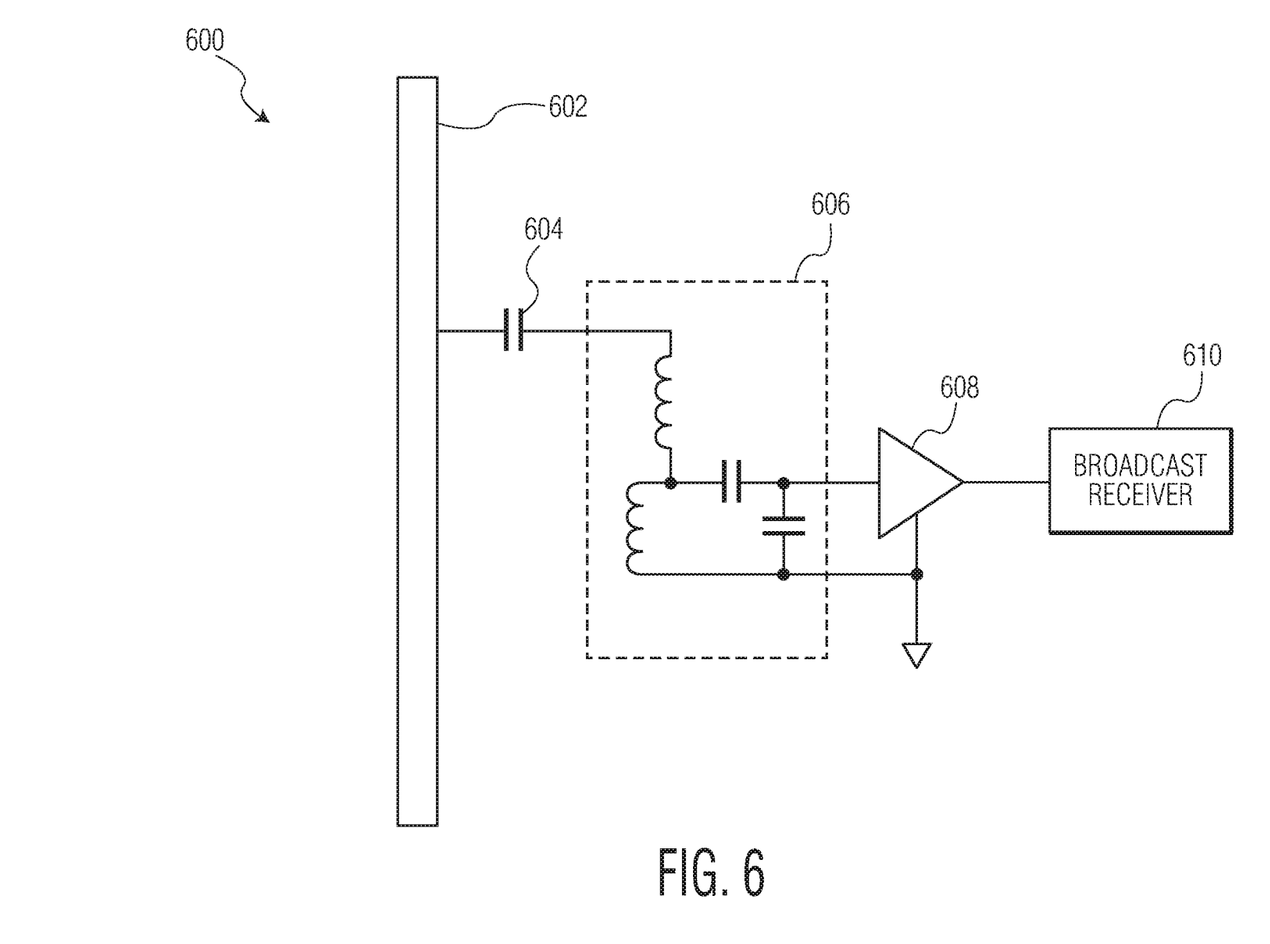
FIG. 6 is a second example electrical circuit for the mobile communications device.

FIG. 6 is a second example electrical circuit 600 for the mobile communications device 400. A capacitive coupling 604, formed from the conducting surface 406 in FIG. 4, connects a bio-antenna 602 to a matching circuit 606.

The matching circuit 606 includes multiple inductors and capacitors, which in some example embodiments are adjustable. The matching circuit 606 together with the bio-antenna 602 form a bandpass filter for a preselected portion of the broadcast frequency band. In another example embodiment the formed bandpass filter covers the entire FM broadcast frequency band.

The matching circuit 606 is coupled to a low noise amplifier 608. Together the matching circuit 606 and the low noise amplifier 608 represent the filter 408 in FIG. 4. The low noise amplifier 608 is connected to a broadcast receiver 610 (e.g. radio system). The matching circuit 606 and low noise amplifier 608 in one example are adjusted by the broadcast receiver 610.

Figure 7:
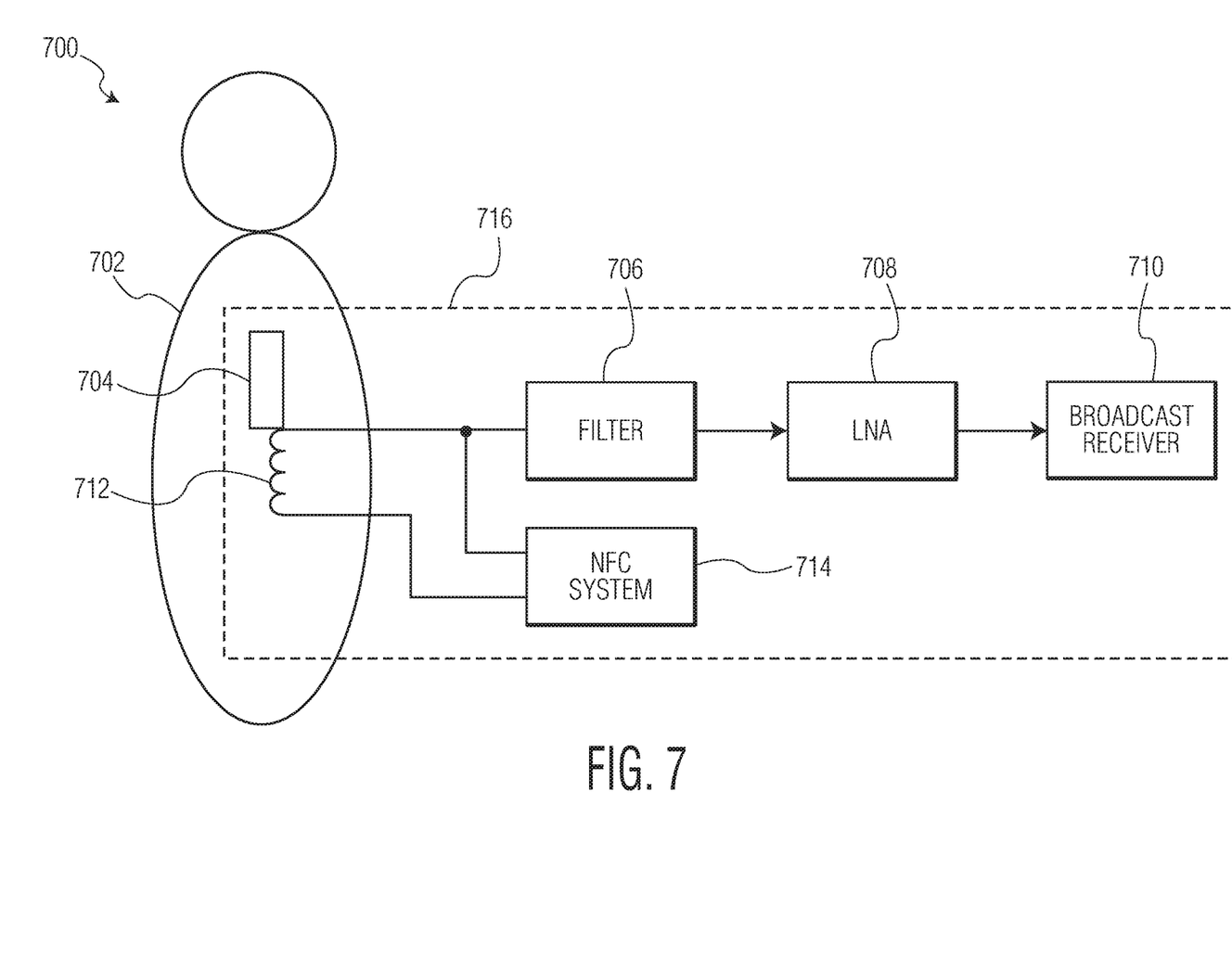
FIG. 7 is a fourth example mobile communications device.

FIG. 7 is a fourth example mobile communications device 700. In this example embodiment, the fourth example device 700 for broadcast reception is combined with a near field communication circuit and forms part of a body area network.

In one example embodiment, the device's 700 broadcast reception functionality is integrated in a smart watch that is also able to use NFC to communicate with other wearable devices in the body area network. The demodulated broadcast radio audio or data can then use NFC to communicate this demodulated information to other NFC enabled devices.

A conducting surface 704 forms a capacitive coupling between a bio-antenna 702 and a filter 706. The conductive surface 704 can be constructed from copper material attached to a flexible dielectric material. The thickness of the copper material can be for example 0.035 mm. The surface area of the conducting surface 704 in one example is about 3 cm×2 cm.

The filter 706 in one example is a tuning circuit and in another example is a matching circuit. The tuning circuit example includes an inductor and a capacitor, which in some example embodiments are adjustable. The matching circuit example includes multiple inductors and capacitors, which in some example embodiments are also adjustable.

The filter 706 is coupled to a low noise amplifier 708. The low noise amplifier 708 is connected to a broadcast receiver 710 (e.g. radio system). The filter 706 and low noise amplifier 708 in one example are adjusted by the broadcast receiver 710.

In this example, a coil 712 couples the conductive surface 704 to a near field communication (NFC) circuit 714. The coil 712 in one example can be a planar air coil having a 3.6 µHenry inductance. Alternatively, the coil 712 could be wound on a ferrite rod with a size of 2 mm diameter and 6 mm length. The coil 712 can be tuned to the NFC circuit's 714 operating frequency (e.g. 10.6 MHz) using a capacitor bank, resonance circuit and resistor bank integrated into the NFC circuit 714.

The NFC circuit 714 may establish transmit and receive communications with one or more other NFC devices attached to the bio-antenna 702 or positioned nearby. NFC is known as a communications system which uses magnetic and/or electric induction.

If the NFC circuit 714 uses electric induction, a portion of the NFC circuit's 714 electric near field may be generated and/or captured by the conductive surface 704.

Broadcast reception can be in the FM frequency band from 88 to 108 MHz while the NFC circuit 714 can range between 8 and 15 MHz (10.6 MHz is a typical NFC operational frequency. Thus both the NFC and broadcast portions of the device 700 can operate concurrently.

However, to prevent interference between the mobile communications device's 700 broadcast reception functions and NFC transmit functions, the filter 706 includes a blocking filter (not shown) at the NFC circuit's 714 frequencies of operation. The blocking filter can be a high-pass filter, low-pass filter or notch filter.

The blocking filter reduces or prevents the NFC circuit 714 from injecting the NFC circuit's 714 transmit voltage signals into the low noise amplifier 708 used by the broadcast receiver 710.

In one example embodiment, each of the elements described above, except the bio-antenna 702, are integrated into a single chip 716. The chip 716 may itself be embedded in a smartwatch (not shown) or other body wearable device or item (e.g. helmet, clothing, bandage, etc.).

Figure 8:
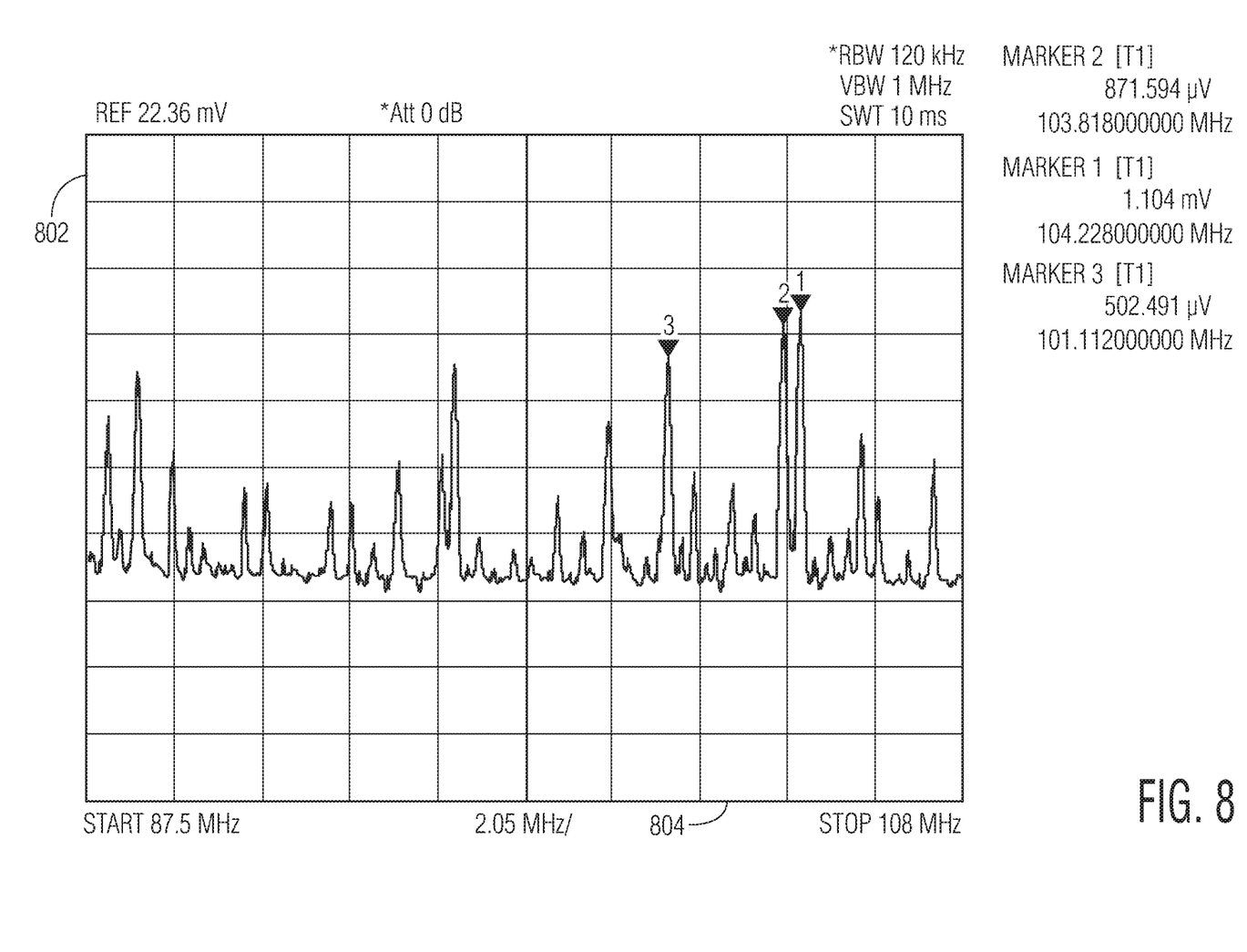
FIG. 8 is a second example set of measurements.

FIG. 8 is a second example set of measurements 800 of a bio-antenna received signal strength 802 over a range of signal frequencies 804. In this example 800 the mobile communications device 400 includes the second example electrical circuit 600.

The example set of measurements 800 displays multiple broadcast reception (i.e. FM transmitter) signals. The measurements were taken in an indoor setting, where signal levels are typically significantly attenuated as compared to an outdoor setting. In another embodiment, a mobile communications device comprises additional conducting surfaces configured to receive a second set of bio-antenna modulated broadcast signals and pass the second set of broadcast signals to the broadcast receiver.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A communications device, comprising:
    a conducting surface configured to capacitively couple to a bio-antenna, capture a modulated broadcast radio signal characterized by a first operational frequency when capacitively coupled to the bio-antenna, and provide a modulated NFC electric field characterized by a second operational frequency via the bio-antenna;
    a broadcast receiver coupled to the conducting surface configured to receive the captured modulated broadcast radio signal, to demodulate the captured modulated broadcast radio signal, and to extract broadcast information from the demodulated broadcast radio signal;
    the near field communication circuit coupled to the broadcast received, having a single modulated NFC electric field connection, and configured to modulate an electric signal based on the broadcast information and provide the modulated electric signal at the single modulated NFC electric field connection; and
    a coil having a first connection coupled to the conducting surface and a second connection coupled to the single modulated NFC electric field connection of the near field communication circuit.

2. The device of claim 1:
    wherein the conducting surface is configured to be positioned proximate to but not directly touching a bio-antenna.

3. The device of claim 1:
    wherein the conducting surface conforms to a contour of a bio-antenna.

4. The device of claim 1:
    wherein the conductive surface has a set of planar dimensions that are less than 10% of a wavelength of the broadcast signals that the conductive surface is configured to receive.

5. The device of claim 1:
    wherein the conducting surface includes at least one of: a metalized plastic foil; a copper material, or a flexible dielectric material.

6. The device of claim 1:
    further comprising additional conducting surfaces configured to receive a second set of bio-antenna modulated broadcast signals and pass the second set of broadcast signals to the broadcast receiver.

7. The device of claim 1:
wherein the broadcast signal is in a frequency band ranging from 87.5 MHz to 108.0 MHz.

8. The device of claim 7, wherein the second operational frequency is a frequency in a range of 8 to 30 MHz.

9. The device of claim 1:
wherein the modulated broadcast signal is one of: a human body modulated broadcast signal, a human arm modulated broadcast signal, a biological structure modulated broadcast signal, a living organism modulated broadcast signal, an animal modulated broadcast signal, or a plant modulated broadcast signal.

10. The device of claim 1:
further comprising a filter coupled between the conducting surface and the broadcast receiver and configured to pass the first operational frequency.

11. The device of claim 10:
wherein the filter is at least one of: a tuning circuit or a matching circuit.

12. The device of claim 1:
wherein the broadcast receiver is an FM radio receiver.

13. The device of claim 1:
wherein the coil is at least one of: a planar air coil, or a wire wound on a ferrite rod.

14. The device of claim 1:
wherein the coil is tuned to the second operational frequency.

15. The device of claim 1:
wherein the near field communication circuit is configured to be coupled to a set of nodes in a body area network; and
wherein the near field communication circuit is configured to communicate with the set of nodes using near-field magnetic induction signals.

16. The device of claim 1:
further comprising a blocking filter coupled between the conducting surface and the broadcast receiver; and
wherein the blocking filter is configured to block signals characterized by the second operational frequency from reaching the broadcast receiver.

17. The device of claim 16:
wherein the blocking filter is at least one of: a high-pass filter, low-pass filter, a notch filter, or a broadband bandpass filter.

18. The device of claim 1:
wherein the near field communication circuit is configured to communicate the broadcast information to a remote near field communication device.

19. The device of claim 1:
wherein the communications device is embedded in at least one of: an earbud, a smartwatch; a medical implant; a smartphone, an item of clothing; a cellular phone, a portable radios, a wearable product, a body attached communication node, a chip, a semiconductor device, or a radio IC.

* * * * *